April 14, 1959  C. GUZIK  2,881,553
ANIMAL TRAP

Filed Nov. 18, 1957  3 Sheets-Sheet 1

INVENTOR.
CASIMIR GUZIK
BY
Fay & Fay
ATTORNEYS

April 14, 1959    C. GUZIK    2,881,553
ANIMAL TRAP
Filed Nov. 18, 1957    3 Sheets-Sheet 2
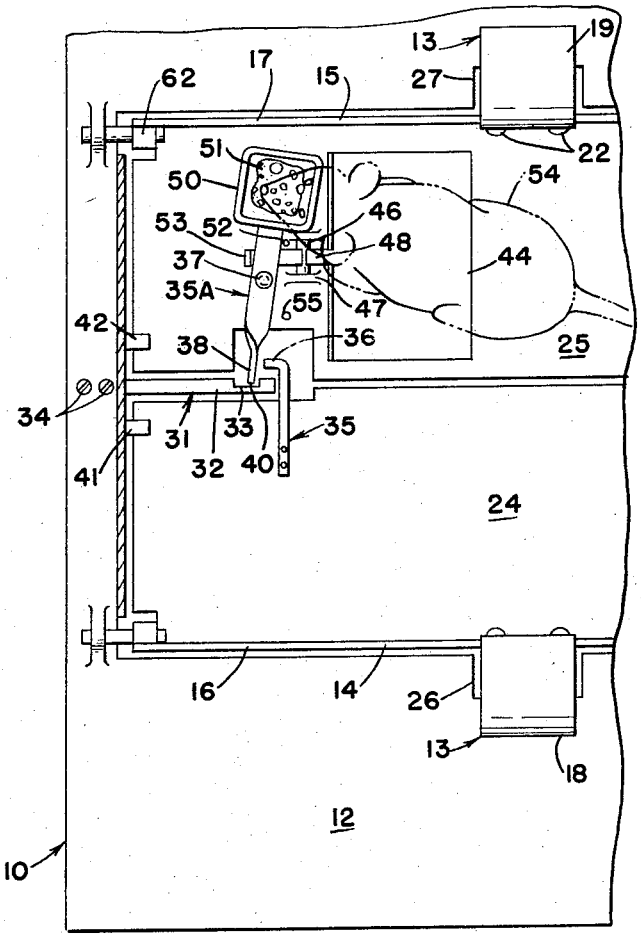
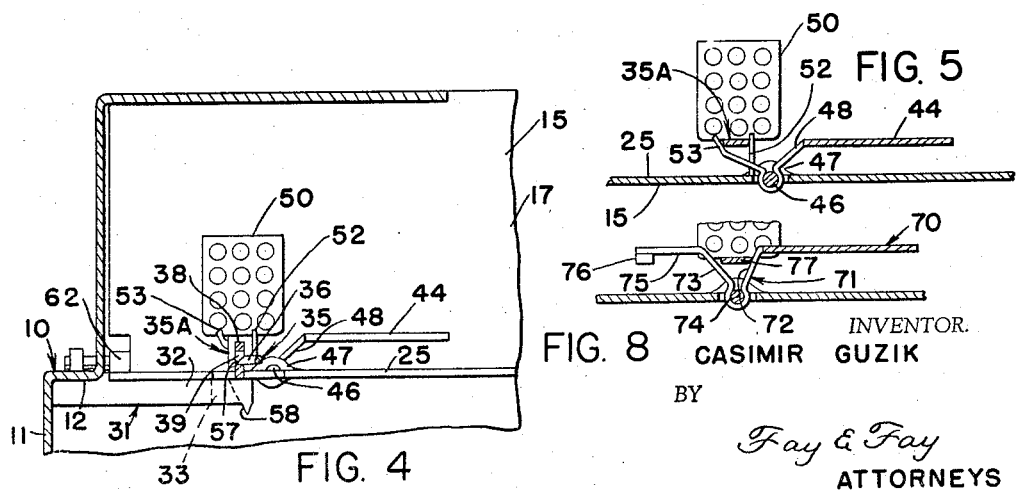
INVENTOR.
CASIMIR GUZIK
BY
Fay & Fay
ATTORNEYS INVENTOR.
CASIMIR GUZIK
BY
Fay & Fay
ATTORNEYS

United States Patent Office 2,881,553
Patented Apr. 14, 1959

---

2,881,553

ANIMAL TRAP

Casimir Guzik, Oakwood Village, Ohio

Application November 18, 1957, Serial No. 697,144

2 Claims. (Cl. 43—70)

This invention, relating as indicated to an animal trap, is particularly directed to a resetting animal trap that may either kill or capture small animals of the rodent family.

In some locations where the number of animals is great and destruction of the animals is imperative, a resetting trap is desirable and necessary. In these applications a cover for a container or barrel may be filled with a chemical solution which will destroy the animal without creating any odor. In such traps the trap is sprung either accidentally by the animal or by some extraneous means but if they are sprung, then it is desirable to reset the trap without hand resetting on each occasion.

The trap of this application consists of a cover member having a substantially rectangular opening therein with a pair of dihedral shaped members, each of which has an animal platform or door and a closure for the trap forming a dihedral angle with the platform.

This application is a continuation-in-part of my application Serial No. 576,155, filed April 4, 1956, now Patent No. 2,813,370 dated November 19, 1957.

This invention also relates to a resetting trap having bait actuating means and a platform portion, which will collapse into the trap, as well as a closure member to cover the trap as the animal falls in. The closure and platform portion is formed at about a 90° angle.

This application carries my earlier invention forward by making the trap with a resetting feature and by having a weight element attached to the dihedral doors, which weight moves upwardly in opposition to the doors as the trap is sprung and hits the underside of the cover as the trap closure members cover the opening and rebounds to reset the trap after the animal is dropped off the animal platform door members into a container.

This invention particularly resides in the resetting features and in the resilient spring attached to the closure member and extending in a slot in the cover member and downwardly therefrom and adapted to hit the underside of the cover member and store some of the kinetic energy of the door movement caused by the animal as potential energy in the spring so that the trap resets quickly.

An object of this invention is to provide a new and improved resetting animal trap incorporating a pair of door members having a platform portion and a closure portion with bait actuating means therefor, as well as a resetting spring and weight attached to the door members.

A further object of this invention is to provide a new and improved resetting animal trap that may be actuated any number of times and still return to its original position after being tripped so that the animal tripping the trap may be dropped into the trap, and the trap will reset for another use.

A further object of this invention is to provide an improved animal trap with a spring and weight operating means attached to door members, each of the door members having an animal platform portion adapted to pivotally move inwardly of the trap, and a closure member to cover the door in the closed position with a spring and weight attached to said door member through a slot in the cover and downwardly therefrom, whereby the springs will pivot outwardly and contact the cover member when the closure members come across the opening and rebound with the weight extending outwardly in the unbalanced position and, therefore, potential energy is stored in the spring to reset the trap.

A further object of this invention is to provide a new and improved resetting animal trap having special means wherein the doors will operate together, but in the resetting of the doors either door will latch if it should return to its original position before the other door.

To the accomplishment of the foregoing and related ends, said invention consists of the means hereinafter fully described and particularly pointed out in the claims; the following description setting forth in detail one means of carrying out the invention, such disclosed means, however, constituting but one of the various ways in which the principles of the invention may be used.

In the drawings:

Fig. 3 is a fragmentary view of the bait operating means and tripping mechanism, shown released;

Fig. 4 is a cross-sectional view along the line 4—4 of Fig. 2;

Fig. 5 is a cross-sectional view along the line 5—5 of Fig. 2 showing the animal platform trigger device;

Fig. 8 is a cross-sectional view of an alternate version of the triggering means.

Figure 1:
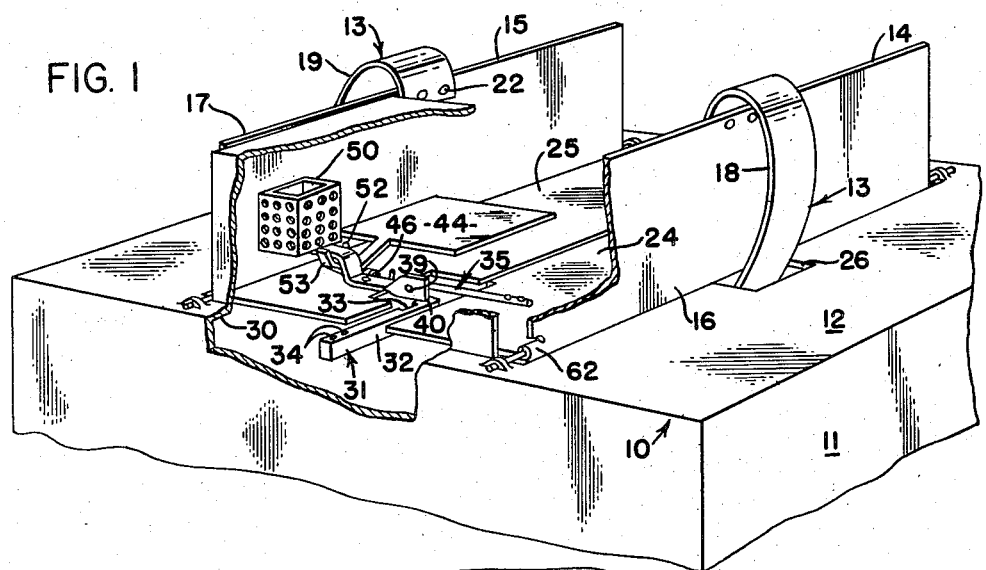
Fig. 1 is a schematic view of my new and improved animal trap.

In connection with the drawings, 10 shows a cover member which may be fitted on a large barrel or metal container, though it also may have sides 11. There will be a deck space or cover portion indicated at 12 on either side to permit the operation of the weights and springs shown generally at 13. The trap basically consists of a pair of dihedral doors 14 and 15, each of said doors having a closure portion 16 and 17, a spring 18 and 19 and a weight on the end thereof 20 and 21. The spring and weight 19 and 21 on the right are attached as by means of a bolt or other fastening means at 22. This may be attached under certain circumstances at the pivot point 23, although the springing would be less.

The other part of the dihedral doors consists of a platform portion 25, and the opposite platform portion is shown at 24. A slot in the cover portion 12 and in the flat space to either side of the dihedral doors is shown at 26 on the right and 27 on the left.

Figure 2:
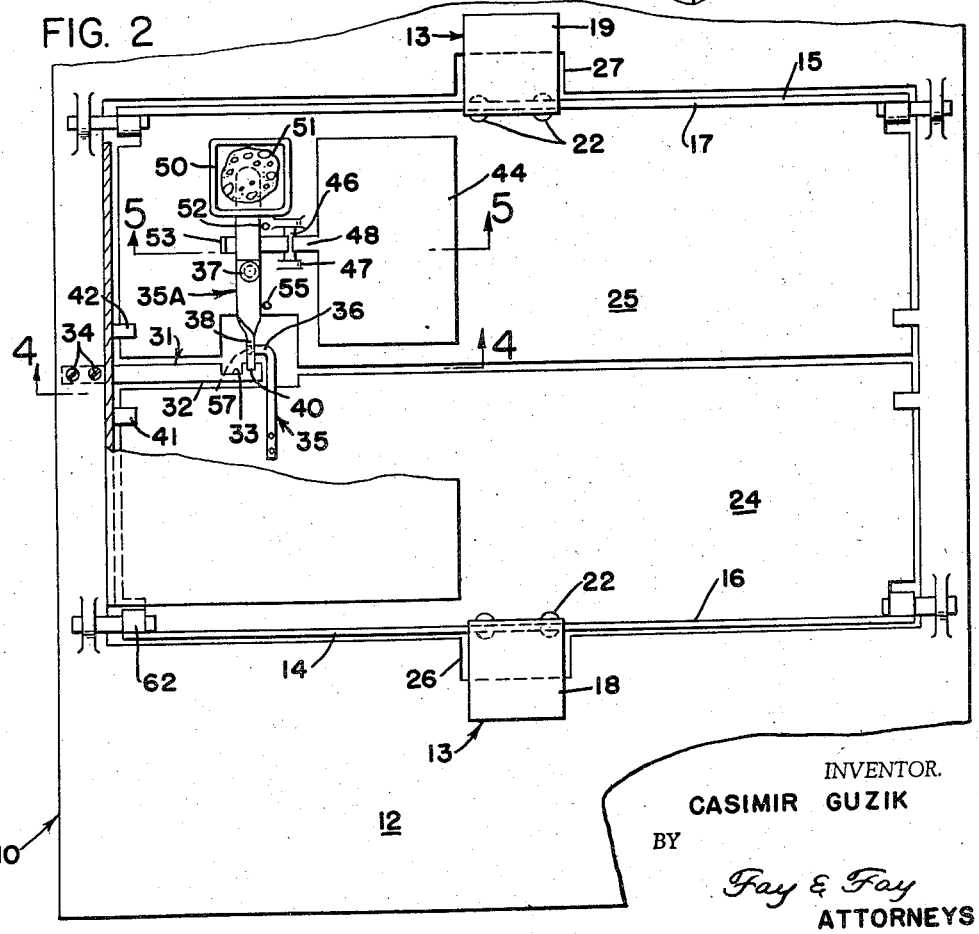
Fig. 2 is a top plan view of the trap.
Figure 6:
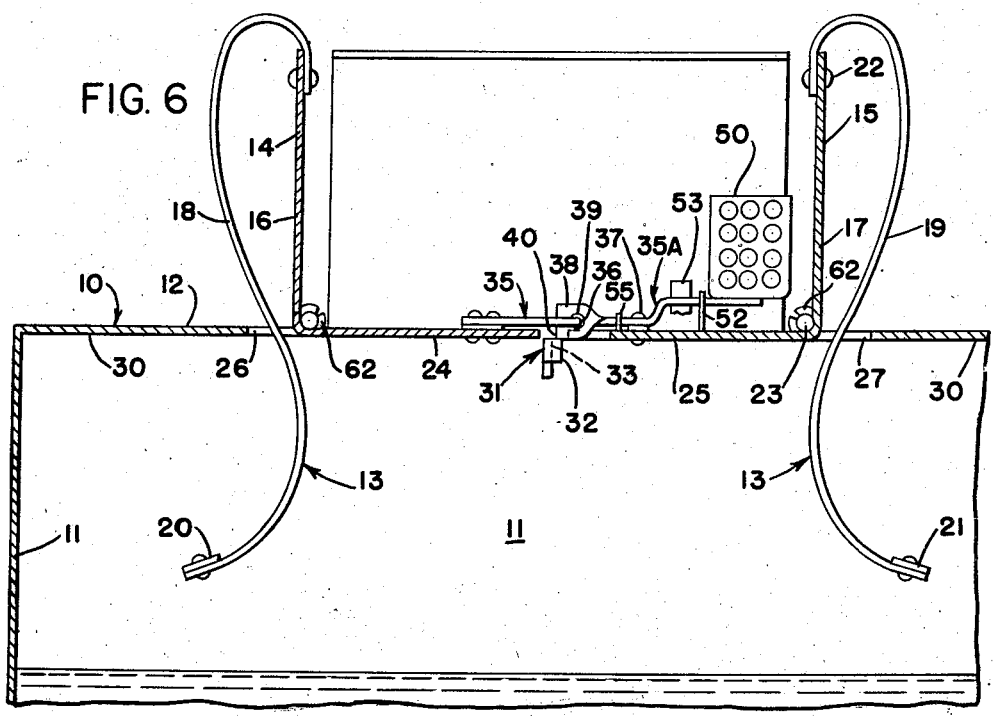
Fig. 6 is a transverse cross-sectional view through my new and improved animal trap showing the resetting springs and weights.
Figure 7:
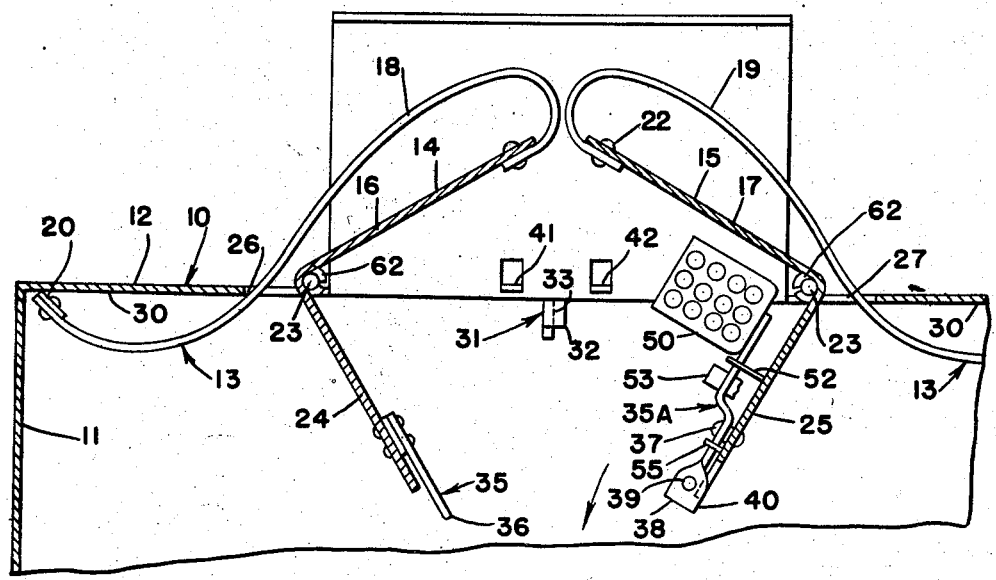
Fig. 7 is a view of the trap in the tripped position showing the closure members for the trap and the springs projecting outwardly before the return movement to reset the trap.

For a further understanding of the invention it should be stated that the dihedral doors are adapted to pivot inwardly so that the closure members will be seen as in connection with Fig. 7. The original position prior to triggering will be seen in connection with Fig. 6. However, in the closed position the weight elements shown at 20 and 21 contact the underside 30 of the cover 10, and the combination of the weights and the springs resets the trap. For a detailed operation of the mechanism of the triggering, consideration should be given to Figs. 1 and 2 in particular but also to Figs. 3, 4 and 5.

In connection with Fig. 7 a rest member, as indicated at 31, has a projection indicated at 32 which is between the two dihedral doors and the animal platform. It has an aperture on one side as seen at 33. The rest portion is fastened as by means of screws shown at 34 to the cover 10. Each of the doors has a projection or arm, as, for example, the hook 35 has a curved portion 36, and the other door shown at 25 has an arm seen generally at 35A pivoted at 37 and has a vertical portion shown at 38 with an opening 39. The end of the arm shown at 40 rests on the arm 32. Movement about the pivot point 37 causes the arm 38 to pull out of the hooked curved portion 36 and also off the ledge or rest into the recess 33. The operation of the trigger mechanism and the bait carrier will be disclosed shortly. A pair of stops shown at 41 and 42 arrest the cover in its return position in the process of resetting.

In connection with the operation of the animal platform 5 and the bait trigger means, a small rectangularly shaped platform is shown at 44 pivoted around a pivot point 46. The pivot point is formed by having a bar element secured in the cover means by means of two straps, one of which is shown at 47, and an arm 48 from the platform 44 encircles the pivot. The extended portion of arm 48, which is designated 53, projects around the arm 35A which is pivoted about a point 37. A bait carrier 50 is mounted on the arm 35A and may have bait or other means shown generally at 51 therein in a cage-like structure. A spring element 52 is secured to the cover 25 and upon a pull on the bait in the carrier 50 the trap will be triggered. Upon a release of the bait the arm will spring back to its original position by the action of spring 52 and against the stop pin 55. The platform 44 pivoted about pivot 46 may also trigger the bait. The projecting end of the arm may be seen in connection with Fig. 1 at 53.

The operation of the bait when triggered can be seen clearly in connection with Fig. 3. When the arm 35A is moved to the left extending the spring 52 making it under tension, the trap may be triggered by the animal standing on the platform 44 as shown generally at 54, or by a pull on the bait 51 in the carrier 50. The vertical member 38 on the arm 35A will pull out from the hooked portion 36 and off the rest of the arm 32 into the groove 33.

Figs. 4 and 5 show the details of this operation, and in connection with Fig. 4 it should be made clear that upon the resetting of the trap the hooked portion as seen at 36 has a sloped portion 57 which permits it to latch into the opening in the vertical portion 38 on the arm 35A whether it should bounce back simultaneously or slightly behind the opposite arm. Similarly, the lower portion of the arm 32 has a sloped portion as seen at 58 to permit the other arm to rise up and latch if it should follow the opposite dihedral door. It will be noted that with the animal off of the platform portions 24 and 25, the closure portions 16 and 17 are weighted in such a way about their pivots so they will return to the vertical position. However, with the animal on the platform and with the doors triggered, the balance is upset, and the closure portions 16 and 17 of the doors pivot downwardly. When in the downward position with the closure portions covering the opening, however, the weights swing upwardly, and the momentum of the door causes the energy to be stored in the spring as it hits the underside of the cover, further facilitating the bounceback of the dihedral doors to their original position. Each of the dihedral doors is a single piece with a portion of the door cut out and surrounding the longitudinal pivots. This permits an easy turning of the dihedral doors, including the animal platform and closure members on the pivot. This structure is shown at 62 in the drawings.

Fig. 8 shows in cross section the animal platform which has been arbitrarily numbered 70 in an alternate version, and has a V-shaped section 71 connected thereto, and comprising a downwardly sloping section 72 and an upwardly sloping section 73 joined by a pivotal connection 74. A further arm 75 extending in the opposite direction has a weight 76. The weight tends to return the platform to its original position and resets the trap. The cross-sectional view of the bait arm is seen at 77, and there is a slight play between the two sections 72 and 73 of the V. By this means springs are eliminated in the trap.

Although the present invention has been described in connection with a preferred embodiment, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. A resetting animal trap cover comprising a top member having top, end and side walls adapted to be fitted on a container and having a substantially rectangular opening therein, a pair of door members pivoted to said top member, each of which includes an animal platform portion and a closure portion forming a dihedral angle, resetting means attached to each of said pair of door members on the opposite side from the animal platform portion, trigger means in connection with each of said animal platform portions for simultaneously releasing said animal platform portions from a horizontal set position, said trigger means comprising a hook member secured to one of said door members and projecting from the top surface of one of said platform portions of the door, a bait holder means pivotally secured to the platform portion of the other of said door members by means of an arm, said arm having an aperture adjacent one end thereof, said hook member being adapted to be received in said aperture, and a stop member projecting from one end wall of said top member on which said arm rests when said platform portions are in set position, whereby a pull on the bait will pivot said arm causing said aperture to slip from the hook element while the arm will slide off the rest allowing the doors to pivot downwardly, and an animal triggering platform adjacent to the bait holding member, said animal triggering platform having an arm pivotally connected to said animal platform portion, said triggering platform arm having a portion extending beyond said pivotal connection and loosely connected to said arm of said bait holding member, whereby downward pressure on the animal triggering platform will trigger the bait holding member and arm to release the trap from set position, the closure portion of each of said doors being substantially the same size as the platform portion projecting therefrom, said closure portion being adapted to close when the trap is sprung, and whereby the resetting arm means extending from the doors pivots outwardly to exert a return force upon the doors to reset the doors to their set position.

2. The resetting animal trap of claim 1 in which the animal triggering platform arm extending beyond its pivotal connection with said platform projects upwardly from said platform, and in which the bait holding member arm is received in a V formed by the extended portion of said triggering platform arm so that action on the animal triggering platform will move the bait holding member in a direction to release the trap, and in which the free end of said extended portion of said triggering platform portion has a weight thereon to reset the animal triggering platform.

References Cited in the file of this patent

UNITED STATES PATENTS

| | | |
|---|---|---|
| 74,256 | Thomas | Feb. 11, 1868 |
| 405,006 | Brawn | June 11, 1889 |
| 572,811 | Krauth | Dec. 18, 1896 |
| 2,813,370 | Guzik | Nov. 19, 1957 |